United States Patent
Hänfling et al.

[11] Patent Number: 5,922,291
[45] Date of Patent: Jul. 13, 1999

[54] REFORMING REACTOR SYSTEM AND PARTICLE FILTER USABLE THEREFOR

[75] Inventors: Josef Hänfling, Markdorf; Dietmar Heil, Schwendi; Rainer Autenrieth, Erbach; Norbert Wiesheu, Günzburg, all of Germany

[73] Assignee: Daimler-Benz AG, Germany

[21] Appl. No.: 08/873,772

[22] Filed: Jun. 12, 1997

[30] Foreign Application Priority Data

Jun. 15, 1996 [DE] Germany .............. 196 23 998

[51] Int. Cl.$^6$ .................................. B01J 8/02
[52] U.S. Cl. ................ 422/211; 422/171; 422/177; 422/179; 422/221; 96/108; 55/385.1; 55/482; 55/525
[58] Field of Search ............. 96/123, 108; 55/525, 55/526, 486, 487, 489, 482, 385.1; 422/171, 177, 190, 191, 189, 179, 221, 211

[56] References Cited

U.S. PATENT DOCUMENTS

| | | | |
|---|---|---|---|
| 2,671,719 | 3/1954 | Lewis et al. | 422/190 |
| 5,672,629 | 9/1997 | Heil et al. | 518/704 |

FOREIGN PATENT DOCUMENTS

| | | |
|---|---|---|
| 0580005 | 1/1994 | European Pat. Off. . |
| 2409079 | 6/1979 | France . |
| 521682 | 3/1931 | Germany . |
| 6919686 | 3/1969 | Germany . |
| 3910554 | 10/1989 | Germany . |
| 8790076 | 10/1989 | Germany . |
| 3934183 | 1/1991 | Germany . |
| 9102970 | 11/1991 | Germany . |
| 4033019 | 4/1992 | Germany . |
| 4204758 | 8/1992 | Germany . |
| 4111031 | 10/1992 | Germany . |
| 9218021 | 9/1993 | Germany . |
| 4223278 | 1/1994 | Germany . |
| 3407617 | 10/1994 | Germany . |
| 4420752 | 9/1995 | Germany . |
| 4417347 | 11/1995 | Germany . |
| 4423587 | 1/1996 | Germany . |
| 4423587 | 9/1996 | Germany . |
| 737457 | 9/1955 | United Kingdom . |
| 1534019 | 11/1978 | United Kingdom . |

OTHER PUBLICATIONS

Patent Abstracts of Japan, Oct. 12, 1988, vol. 12, No. 382, 63–129002, published Jun. 1, 1988, "Internal Heating Fuel Reformer."

Patent Abstracts of Japan, Jul. 16, 1990, vol. 14, No. 330, 2–120203, published May 8, 1990, "Medium Hearing Type Reformer."

*Primary Examiner*—Hien Tran
*Attorney, Agent, or Firm*—Evenson, McKeown, Edwards & Lenahan, P.L.L.C.

[57] ABSTRACT

A reforming reactor system for water vapor reforming of methanol in fuel-cell operated motor vehicles has a reactor unit with a catalyst-filled reaction space and a particle filter which is arranged in a reformate gas pipe downstream of the reactor unit. The catalyst material is carried in the reaction space by a sieve below which a metallic nonwoven for catching sieved-out fragments and dust particles of the catalyst fill is situated. The particle filter contains a spun steel wool netting and/or several filter steps serially connected behind one another. The particle filter may be arranged to be exchangeable without interrupting the operation of the system. Specifically, a particle filter which has a filter body which can be changed in a gas-tight manner transversely to the gas flow and/or a cyclone filter can be used which has a closing device for the purpose of an emptying of a particle collecting pot which does not interrupt the operation.

17 Claims, 4 Drawing Sheets

REFORMING REACTOR SYSTEM AND PARTICLE FILTER USABLE THEREFOR

BACKGROUND AND SUMMARY OF THE INVENTION

This application claims the priority of German application 196 23 998.2-41 filed in Germany on Jun. 15, 1996, the disclosure of which is expressly incorporated by reference herein.

The invention relates to a reforming reactor system having at least one reactor unit filled with a catalyst material and having a particle filter which is arranged in a reformate gas pipe downstream of the reactor unit, as well as to a particle filter which can be used therefor.

A system of the initially mentioned type is disclosed in U.S. Pat. No. 2,671,719. That system is used for the industrial production of a gas mixture of hydrogen and carbon monoxide. In this case, a hydrocarbon is first reacted with a metallic oxide in a reduction reaction chamber while forming carbon oxides, hydrogen, water and free metal and subsequently the pertaining suspension is fed as a column of water into a reforming reactor unit in which the desired reforming reaction takes place. The obtained reformate gas is discharged by way of a reformate gas pipe in which a cyclone filter is arranged in order to separate entrained solid particles. The separated particles are fed by way of a return pipe connected on the bottom to the cyclone filter back into a reduction reaction chamber arranged upstream of the reforming reaction unit.

Cyclone filters for a particle separation are generally known in different constructions; see, for example, German Published Patent Application DE 41 11 031 A1 as well as British Patent Documents GB 1 534 019 and GB 737 457, and German Patent Documents DE 39 34 183 C1 and DE 521 682. A multi-step particle filter, in the case of which a first step is formed by a cyclone filter and a second step is formed of sintered-metal fine filter elements, is disclosed in European Published Patent Application EP 0 580 005 A2. A filter for the particle separation, which consists of several cloth layers which are situated behind one another and have different permeabilities, is described, for example, in German Published Patent Application DE 44 17 347 A1. Another filter of this type, which is preferably used in pyrotechnical gas generators for air bags of motor vehicles, is described in German Published Patent Application DE 42 04 758 A1. As required, a ceramic paper foil which acts as a heat shield is inserted between the filter cloth layers. Another type of filter contains several perforated plates which are connected behind one another in the gas flow direction and which are constructed with hole diameters which become smaller in the flow direction and/or are arranged with openings which are offset with respect to one another transversely to the flow direction; see, for example, the German Utility Models DE 87 90 076 U1 and DE 91 02 970 U1 as well as the German Published Patent Applications DE 34 07 617 A1 and DE 39 10 554 A1. Particle filters in the form of fiber braidings are described, for example, in German Published Patent Applications DE 40 33 019 A1, DE 42 23 278 A1 and French Published Patent Application FR 2 409 079 as well as German Utility Models DE 92 18 021 U1 and DE 69 19 686.

In Japanese Published Patent Applications JP 2-120203 (A) and JP 63-129002(A), reforming reactors are disclosed, in the case of which the catalyst material is present in the reactor unit as a pellet fill which is carried by a sieve. An empty outlet space adjoins below the sieve and a reformate gas outlet leads laterally out of this outlet space, by way of which reformate gas outlet the reformate gas leaves the reforming reactor unit.

The invention is based on the technical problem of providing a reforming reactor system which is suitable particularly for reforming water vapor of methanol and which furnishes a largely particle-free reformate gas flow, as well as a particle filter which can be used for this purpose.

Certain preferred embodiments of the invention solve this problem by providing a reforming reactor system for the water vapor reforming of methanol, comprising a reactor unit with a catalyst-filled reaction space, a sieve which carries a catalyst fill charged into the reaction space, a metallic nonwoven for collecting the sieved-out fragments and dust particles which is arranged in the reaction space at a distance below the sieve designed for the sieving-out of fragments and dust particles of the catalyst fill while forming a space situated in-between which is free of metallic nonwovens and to which the a gas pipe is connected, and a particle filter arranged in the reformate gas pipe downstream of the reactor unit.

In the case of preferred embodiments of such a reforming reactor system, the reactor unit is filled with a catalyst pellet fill which is carried by a sieve by means of which pellet fragments and pellet dust particles are sieved out of the fill in that, because of their gravity, they fall downward through the sieve. For this purpose, the mesh size of the sieve is smaller than the typical dimensions of undamaged pellets and larger than the dimensions of the fragments and dust particles to be sieved through. By means of the metallic nonwoven arranged under the sieve, the fragments are caught which are sieved out through the sieve. Since the metallic nonwoven is still situated within the reaction space of the reactor unit, the collected fragments can continue to develop their catalytic effect. As another advantage, the fragments collected in the metallic nonwoven cannot clog the gas flow filter which follows. In this case, the reformate gas flow is withdrawn from the space between the sieve and the metallic nonwoven without having to flow through the metallic nonwoven. It is understood that, as desired, a reverse flow direction can also be provided in which case the gas mixture to be reformed is fed into this space between the sieve and the metallic nonwoven.

The particle filter arranged in the reformate gas pipe filters out particles which were entrained by the reformate gas generated in the reactor unit so that a largely particle-free reformate gas flow is obtained on the output side of the particle filter. During the water vapor reforming of methanol for the purpose of generating hydrogen for a fuel cell arrangement connected behind it, for example, for a fuel-cell-driven motor vehicle, it is therefore prevented that particles, for example, in the form of fine catalyst particles, are entrained by the reformate gas flow into the fuel cells and have an unfavorable effect on the catalyst materials situated there. In addition, the sieving-out and filtering-out of particles prevents clogging in the reactor unit and in the following reformate gas flow path which increases the flow resistance. A reforming reactor constructed in this fashion is also particularly suitable for a use in motor vehicles where the risk of a formation of pellet fragments and pellet dust particles is particularly high because of shaking in the driving operation.

In the case of certain preferred embodiments of the reforming reactor system, the particle filter arranged in the reformate gas pipe contains a spun steel wool netting and/or several filter steps which are serially connected behind one another. It was found that, particularly also for the mobile application of a system for the water vapor reforming of methanol arranged in a vehicle, a reformate gas flow is obtained at relatively low expenditures which is reliably purified with respect to entrained particles.

In the case of certain preferred embodiments, a reforming reactor system is further developed such that the particle filter is inserted into the reformate gas pipe with the insertion of a thermal insulation. The thermal insulation prevents undesirable thermal losses, for example, in the form of a condensing out of water on cold walls.

The reforming reactor system according to certain preferred embodiments contains a particle filter which is arranged in the reformate gas pipe such that it can be exchanged without interrupting the operation. Operational interruptions of the system because of a required exchange or a cleaning of the particle filter are therefore avoided.

In the case of certain preferred embodiments of particle filter, the respective used filter body can be exchanged without any problems and without interrupting the operation of the system in that it is pushed out of the filter housing transversely to the gas flow pipe by a newly slid in filter body. In this case, sealing devices are provided which ensure that no significant loss of gas will occur during this exchange operation.

A cyclone filter according to certain preferred embodiments contains a cyclone pot and a particle collecting pot which can be connected below it in a removable manner, as well as a closing device which, when the particle collecting pot is connected, keeps the cyclone pot open with respect to the latter while, when the particle collecting pot is removed, it keeps the cyclone pot closed. The closing device is designed such that the opening and closing movement takes place automatically with the connecting and removal of the particle collecting pot.

In the case of a cyclone filter further developed according to certain preferred embodiments, the closing device contains a closing body which, in a closing position, can be pressed elastically against the cyclone pot wall, as well as an operating element which, when the particle collecting pot is connected, presses the closing body into an opening position spaced away from the cyclone pot wall.

Other objects, advantages and novel features of the present invention will become apparent from the following detailed description of the invention when considered in conjunction with the accompanying drawings.

DETAILED DESCRIPTION OF THE DRAWINGS

Figure 1:
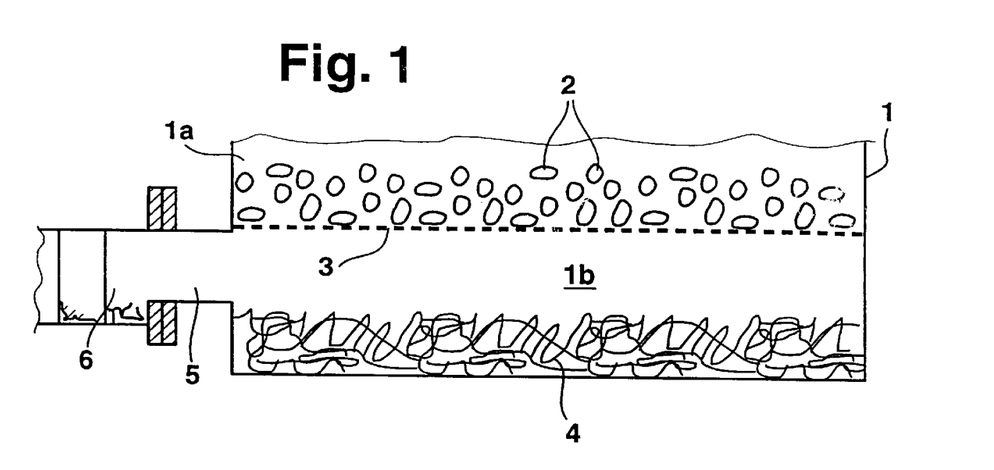
FIG. 1 is a schematic longitudinal sectional view of a lower area of a reforming reactor unit and of an adjoining reformate gas pipe section with an inserted particle filter, constructed according to a preferred embodiment of the invention.

FIG. 1 illustrates a reaction space 1 of a reforming reactor unit in its lower area. The reactor unit may, for example, be part of a reforming reactor system for the water vapor reforming of methanol which is arranged in a fuel-cell-operated motor vehicle in order to generate the hydrogen required for the fuel cells. In an upper reaction space section 1a, the reaction space 1 is filled with a catalyst pellet fill 2 for which, for example, a $Cu/ZnO/Al_2O_3$-material is used which, at a suitable temperature, catalyzes the endothermal water vapor reforming of methanol. The fill 2 is carried by a sieve plate 3 which separates the upper reaction space section 1a from a lower reaction space section 1b. The mesh size of the sieve plate 3 is selected such that pellet fragments and pellet dust particles which occur by a breaking of the pellets and their abrasion with respect to one another, for example, as the result of shaking, can fall downward through the sieve plate 3 while the undamaged pellets are larger than the mesh size of the sieve plate 3. The sieved-out pellet fragments and pellet dust particles arrive in the lower reaction space section 1b. There, they are caught by a metallic nonwoven 4 which is still situated inside the reaction space 1. As a result, the pellet fragments and pellet dust particles collected therein can advantageously continue to exercise their catalytic effect for the reforming reaction to the extent that the gas flow flowing past the metallic nonwoven 4 still contains unreacted constituents.

Below the level of the sieve plate 3 and above the level of the metallic nonwoven 4 arranged at a distance from the sieve plate 3, a lateral reformate gas outlet is provided from which a reformate gas pipe 5 branches off. A particle filter 6 is inserted into the reformate gas pipe 5 and is preferably arranged in a removable manner. This filter 6 is designed such that it can also keep back very fine pellet dust particles which, possibly because of their low mass or weight, may be entrained by the reformate gas flow without depositing on the metallic nonwoven 4. As required, the caught pellet dust particles can be cleaned off the filter 6. Analogously, as required, the metallic nonwoven 4 can be removed from the reaction space 1 via the reformate gas outlet and the collected pellet fragments and pellet dust particles can be cleaned off the metallic nonwoven 4.

The sieving-out or the filtering-out of the pellet fragments and the pellet dust particles reliably prevents clogging in the gas guiding path of the reactor unit by such fragments or dust particles. The reactor is therefore particularly suitable for a use in motor vehicles, where, as a result of shaking, such fragments and dust particles of the catalyst material may be formed to a considerable degree. Advantageous types of particle filters which can be used in the reformate gas pipe 5 will be described in detail in the following with reference to FIGS. 2 to 11.

Figure 2:
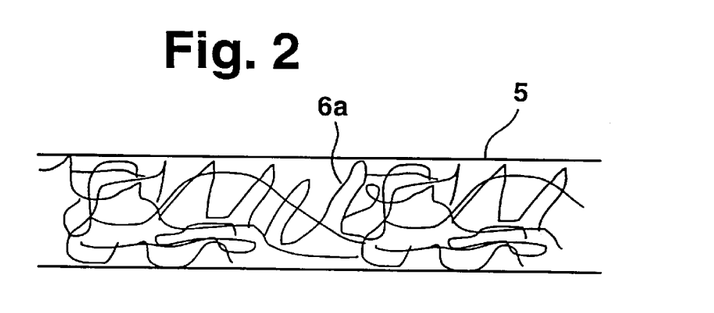
FIG. 2 is a schematic longitudinal sectional view of a particle filter in the form of a spun steel wool netting which can be used in the reformate gas pipe of FIG. 1.

FIG. 2 shows an application in which a spun steel wool netting 6$a$ is inserted as a particle filter into the reformate gas pipe 5. When the reformate gas flow passes through the spun steel wool netting 6$a$, even fine dust particles will deposit on the latter so that, on the output side, a reformate gas flow is available which is cleaned with respect to particles, for example, in the form of a high-hydrogen gas for feeding into a fuel cell system.

Figure 3:
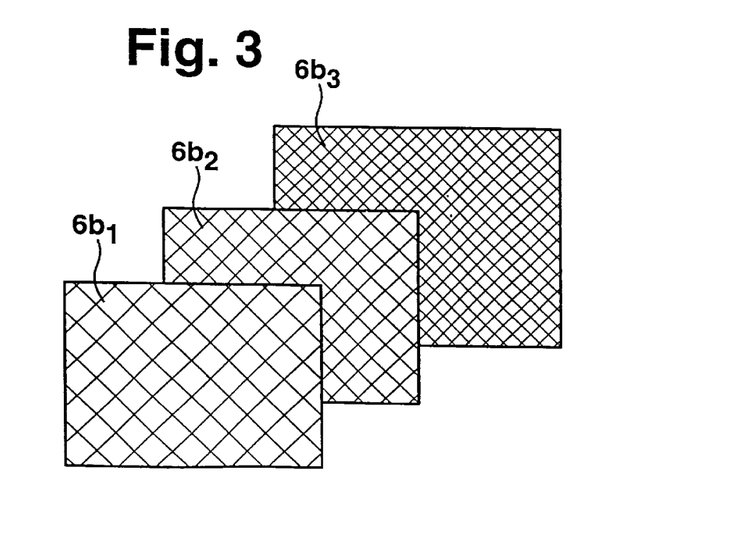
FIG. 3 is an exploded schematic view of a particle filter in the form of a multi-layer mesh filter which can be used in the reformate gas pipe of FIG. 1.

FIG. 3 shows another particle filter in the form of a multi-layer mesh filter which can be used, for example, in the reformate pipe 5 of FIG. 1. This filter consists of a predeterminable number of nonwoven mesh layers $6b_1$, $6b_2$, $6b_3$ which are arranged behind one another as a filter cascade in the gas flow direction. In this case, the mesh size of a nonwoven mesh layer which follows in each case in the flow direction is selected to be smaller than that of the preceding nonwoven mesh layer. This results in a filter cascade with a staggered depositing of particles which prevents a clogging of the finer-mesh layers by coarser particles in that these are already caught in a coarser-mesh front-connected nonwoven mesh layer. In this manner, a long usable life of the filter is achieved, particularly also of the nonwoven mesh layer with the finest mesh size.

Figure 4:
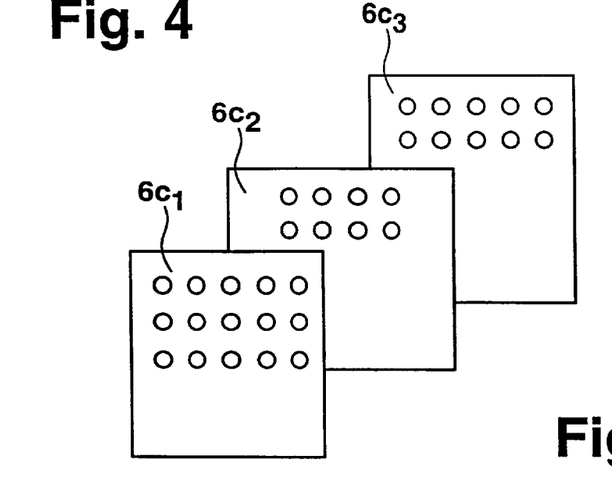
FIG. 4 is an exploded schematic view of a particle filter in the form of a multi-layer perforated filter which can be used in the reformate gas pipe of FIG. 1.

Another multi-step particle filter which can be used in the reformate gas pipe 5 of FIG. 1 is schematically illustrated in FIG. 4. This filter is designed as a multi-layer perforated filter which is formed of a predeterminable number of perforated plate membranes $6c_1$, $6c_2$, $6c_3$ which, in turn, are arranged behind one another in the gas flow direction, in which case the openings in the individual membranes $6c_1$, $6c_2$, $6c_3$, for reasons of simplicity, are not all shown in the exploded view of FIG. 4. Various possible implementations of such a multi-layer perforated filter are illustrated in FIGS. 5 to 7.

Figure 5:
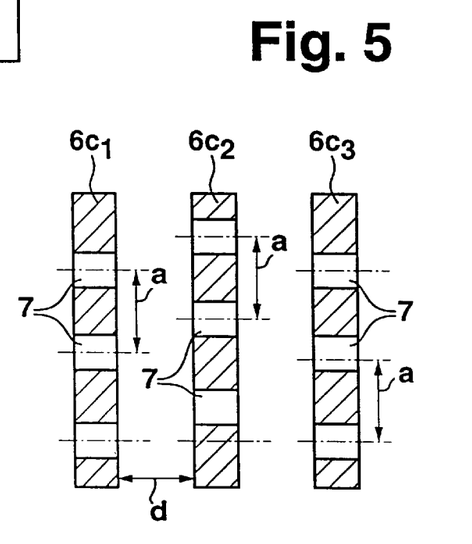
FIG. 5 is a schematic longitudinal sectional view of the filter of FIG. 4.

FIG. 5 is a longitudinal sectional view of the multi-layer perforated filter of FIG. 4 which shows that, in the case of this filter, three identical membranes $6c_1$, $6c_2$, $6c_3$ are used; that is, the individual membranes $6c_1$, $6c_2$, $6c_3$ have the same hole pattern with the identical dimensions of the individual passage holes 7. In order to cause the desired depositing of particles, two successive perforated plate membranes respectively are offset by half the hole pattern distance a and are arranged spaced in the flow direction by a predeterminable distance d. This necessarily results in flow path deflections for the passing-through gas flow which lead to a segregating of entrained particles so that the segregated particles fall downward between the individual perforated plate membranes $6c_1$, $6c_2$, $6c_3$.

Figure 6:
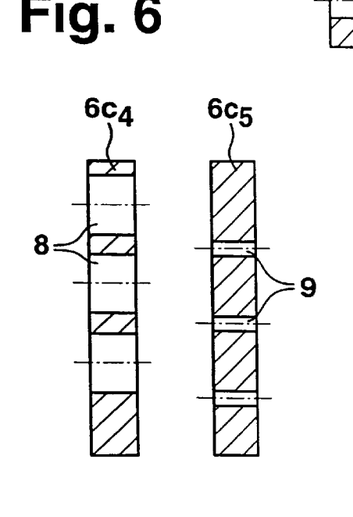
FIG. 6 is a view corresponding to FIG. 5 but for a modified multi-layer perforated filter.

FIG. 6 shows a first variant of the filter of FIG. 5, in which individual perforated plate membranes $6c_4$, $6c_5$ with differently dimensioned passage holes 8, 9 are arranged at a distance behind one another in the gas flow direction. In this case, the membranes $6c_4$, $6c_5$ with the decreasing hole diameter are arranged behind one another; that is, the holes 8 of a membrane $6c_4$ which is in the front in the flow direction are larger than those 9 of a membrane $6c_5$ which follows. In addition, the perforated plate membranes $6c_4$, $6c_5$ are again mutually transversely offset such that the hole areas of a respective membrane, in the longitudinal direction of the filter, that is, in the principal gas flow direction, are aligned with covered areas of the adjacent membranes, whereby deflecting movements are forced onto the passing-through gas flow which cause the desired segregation of particles. As a result of the graduated hole size of the membranes $6c_4$, $6c_5$ of FIG. 6, the particles can be caught between the individual membranes $6c_4$, $6c_5$ sorted according to the sizes, which prevents a clogging of the finer membrane holes by coarser particles in the same manner as in the case of the filter of FIG. 3.

Figure 7:
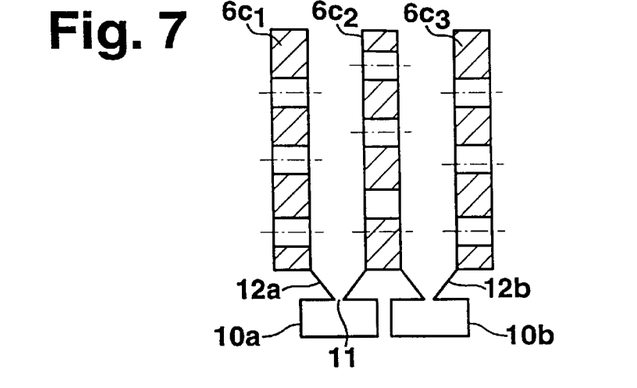
FIG. 7 is a view corresponding to FIG. 5 but for another modified multi-layer perforated filter.

In the case of a second variant illustrated in FIG. 7 of the filter according to FIGS. 4 and 5, one particle collecting receptacle 10$a$, 10$b$ respectively is assigned to the spaces between the individual perforated plate membranes $6c_1$, $6c_2$, $6c_3$, in which, as illustrated above, the particles are segregated from the gas flow guided through the filter and fall downward, by means of which particle collecting receptacles 10$a$, 10$b$ the falling, filtered-out particles are caught. The particle collecting receptacles 10$a$, 10$b$ are provided with narrow inlet slots 11 into which the collecting funnels 12$a$ lead which, in each case, extend from the opposite lower edges of adjacent perforated plate membranes in a narrowing manner downward in order to guide the falling particles into the collecting receptacles 10$a$, 10$b$. As a result of this design of the particle collecting device, it is achieved that segregated particles are not again whirled up and entrained by the gas which flows by. It is understood, that multi-step particle filters of the types described in FIGS. 3 to 7 are not limited to the respective shown number of filter -steps but may contain any number of individual filter layers suitable for the respective application.

Figure 8:
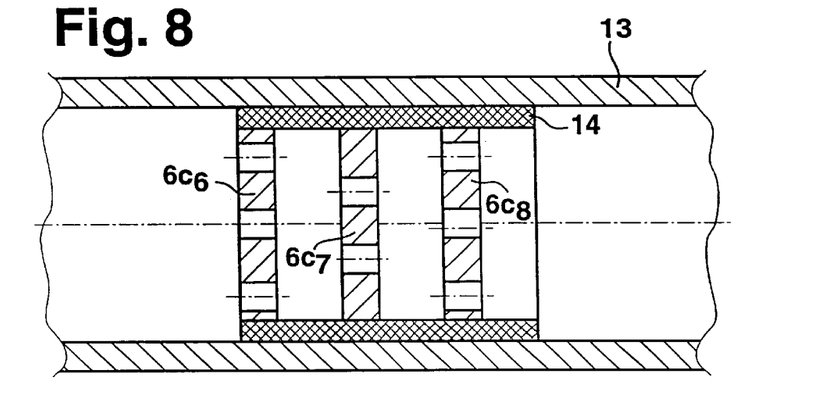
FIG. 8 is a schematic longitudinal sectional view of a multi-hole particle filter inserted in a thermally insulated manner into a reformate gas pipe of the type shown in FIG. 1.

FIG. 8 shows a multi-layer perforated filter of the type of FIGS. 4 to 7 in its operating position inserted into a pipe line 13, for example, into a reformate gas pipe. In this example, the filter contains a thermally insulating jacket 14 by means of which the perforated plate membranes $6c_6$, $6c_7$, $6c_8$, which are situated behind one another in the gas flow direction, are thermally insulated with respect to the wall of the pipe line 13. This avoids thermal losses, such as the condensing-out of water on cold pipe walls. As an alternative, this undesired effect can be achieved by using hydrophobic filter cloths.

Figure 9:
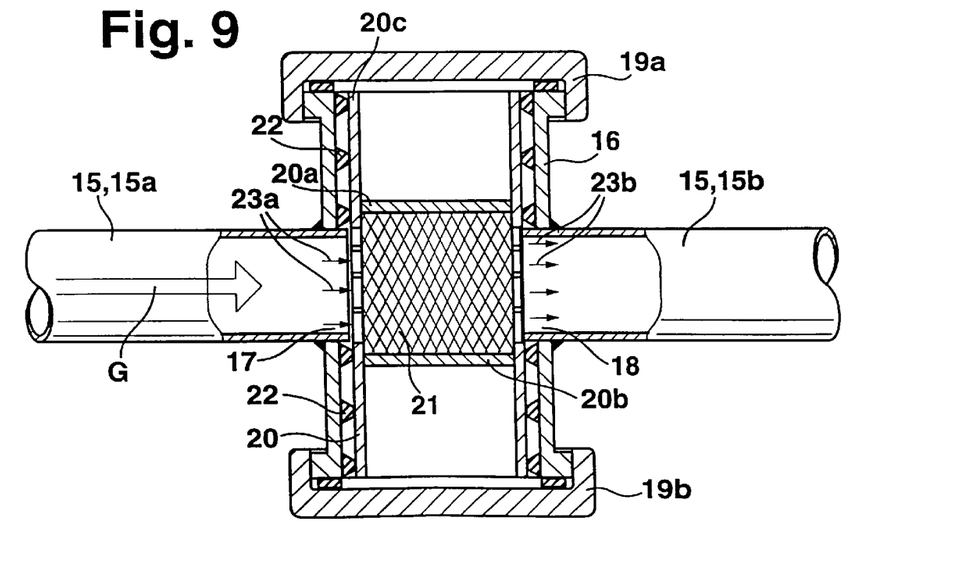
FIG. 9 is a longitudinal sectional view of a particle filter inserted in a reformate gas pipe of the type shown in FIG. 1 and having a filter body which can be exchanged without interrupting the operation.

FIG. 9 illustrates a particle filter which is provided in a pipe line 15, such as a reformate gas pipe, and which is designed such that a filter exchange is possible without interrupting the operation; that is, the operation of a reforming reactor unit, for example, connected in front of the pipe 15 need not be interrupted for this purpose. The particle filter contains a filter housing 16 with a housing inlet opening 17 into which the supplying section 15$a$ of the pipe line 15 is inserted and is welded to the edge of the opening in a gas-tight manner, and with a housing outlet opening 18 into which the outlet-side section 15$b$ of the pipe line 15 is inserted and is welded to the edge of the opening in a gas-tight manner. The filter housing 16 is of a cylindrical shape with a longitudinal axis extending transversely to the gas flow direction G. On its two open ends, the filter housing 16 can each be closed in a gas-tight manner by means of one screw cap 19$a$, 19$b$ respectively with an integrated seal. In the filter housing 16, a cylindrical filter support 20 is accommodated in an axially displaceable manner which in the operation remains fixed in its axial position as a result of the fitted-on screw caps 19$a$, 19$b$.

In a center area, the filter support 20 supports filter body 21, for example, in the form of a metallic nonwoven body, which is bounded transversely to the gas flow direction G by two gas-tight boundary walls 20$a$, 20$b$ of the filter support 20. In contrast, the cylinder jacket 20$c$ of the filter support 20 has a gas-permeable perforated construction in the center section adjoining the filter body 21. By means of its two end sections, the filter support jacket 20c rests against, for example, O-shaped or V-shaped ring seals 22 which, on the other side, are supported against the interior wall of the filter housing 16.

In the operation, a gas flow 23a, which may be loaded with entrained particles, is supplied by way of the inlet-side section 15a of the pipe line 15 and is introduced, through the perforated filter support jacket section into the filter body 21 which, during the passage of the gas flow, causes the required separation of particles. The gas flow will then leave the filter body 21 on the outlet side by way of the perforated filter support jacket section and, as a gas flow 23b purified of the entrained particles, arrives in the outlet-side section 15b of the pipe line 15.

Figure 10:
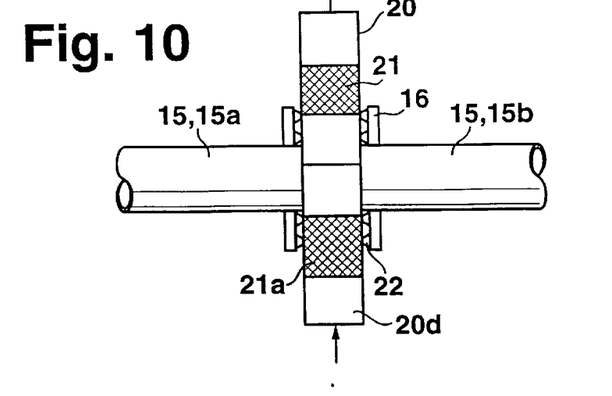
FIG. 10 is a schematic longitudinal sectional view corresponding to FIG. 9 during a filter body exchange operation.

When the filter body 21 is saturated with separated particles, by means of the especially constructed particle filter according to FIG. 9, a filter exchange can take place which is free of operational interruptions and which is illustrated in conjunction with FIG. 10. For such a filter exchange, the two screw caps 19a, 19b are first removed so that the inserted filter support 20 can be moved axially out of the filter housing 16. A new filter support 20d with a fresh filter body 21a is slid into the filter housing 16 from the direction of a face of the housing. The newly pushed-in filter support 20d simultaneously presses the previously inserted filter support 20 out on the other face of the housing.

FIG. 10 shows the situation with a half-inserted new filter support 20d and a half-pushed-out, previously inserted filter support 20. Since the cylinder jacket of the filter support 20, 20d is constructed to be gas permeable only in its center section assigned to the filter body 21, 21a, the jacket surfaces of the two filter supports 20, 20d in the intermediate positions, during such a filter exchange, block off the housing inlet 17 or the inserted end of the supplying pipe line section 15a and the housing outlet 18 of the particle filter or the inserted end of the discharging pipe line section or outlet section 15b, which prevents a lateral escaping of noticeable quantities of gas during this short filter changing period. In a supporting manner, the ring seals 22 seal off the gap between the filter housing 16 and the filter supports 20, 20d moved through. As soon as the new filter support 20d has reached its operating position, the previously inserted filter support will be free and can be subjected to a cleaning. After the screw caps 19a, 19b are screwed on, the newly inserted filter support 20d will be fixed in its axial position, and its filter body 21a will cause the required particle separation for the operating period which follows.

In this manner, a respective exhausted filter body can be cleaned outside the pipe line 15 in which the gas flow to be purified is guided so that particularly no interruption of the operation is required of the system connected with the pipe line 15, for example, of a reforming reactor system, because of flooding of the line 15 with the cleaning gas flow. In addition, in the case of a filter change of the particle filter of FIG. 9, a penetration of oxygen into the pipe line 15 and thus possibly into the connected reforming reactor units is avoided which may cause an undesirable deactivating of reforming catalyst material situated there.

Figure 11:
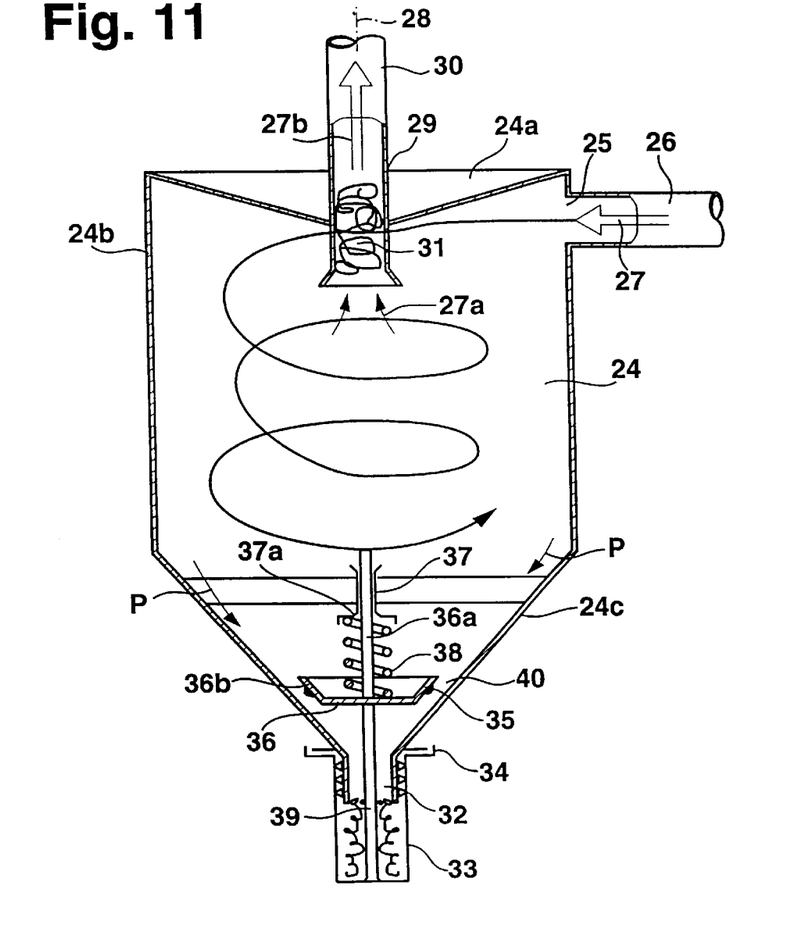
FIG. 11 is a longitudinal sectional view of a cyclone filter which can be used in a reformate gas pipe of the type shown in FIG. 1 and has a particle removal possibility which does not interrupt the operation.

Another particle filter which can be used, for example, in a reformate gas pipe of a reforming reactor system and permits a withdrawing of separated particles without an interruption of the operation of the system is illustrated in FIG. 11 in the form of a special cyclone filter. The cyclone filter illustrated there contains a cyclone pot 24 which, in an upper area, has a lateral gas inlet opening 25 to which an inlet-side pipe line section 26 is connected by way of which a gas flow 27 is supplied which is to be purified of possibly entrained particles. In particular, this can be a reformate gas flow generated by a reactor unit of a reforming reactor system. By means of the cyclone pot side wall 24b and a cyclone pot cover 24a having a conical construction on the bottom side, the entering gas flow 27 is deflected into a flow which, in a spiral manner about the longitudinal cyclone filter axis 28, extends downward.

In the pot cover 24a, a center gas outlet opening 29 is provided through which an outlet-side pipe line section 30 leads out of the cyclone pot 24 in the upward direction. For leaving the cyclone pot 24, the gas flow, which was previously guided downward spirally, ascends in the cyclone pot 24 into the outlet-side pipe line 30. As a result of this course of the flow, in the cyclone pot 24, the particles which may be contained in the supplied gas flow 27 separate while falling downward so that a gas flow 27 which is already largely purified with respect to entrained particles enters into the outlet-side pipe line 30. In order to further increase the particle separation effect and particularly remove finest dust particles still contained in the gas flow 27a from this gas flow, a flow filter in the form of a spun steel wool netting 31 is also arranged in the outlet-side pipe line 30. Downstream of the spun steel wool netting 31, a gas flow 27b which is purified to a high degree with respect to entrained particles is therefore available in the outlet-side pipe line 30.

The cyclone pot 24 tapers in the downward direction in a funnel shape and ends in a particle outlet 32. For catching particles emerging from the particle outlet 32, a particle collecting pot 33 can be connected from below to the funnel end of the cyclone pot 24 by means of a screw plug 34. As required, for example, when it is filled with downward falling particles which were separated in the cyclone pot 24 from the gas flow guided through, the particle collecting pot 33 can be removed from the cyclone pot, can be replaced by an empty particle collecting pot and can be connected again after having been emptied. In order to be able to accomplish this in the continuous operation, that is, without an interruption of the gas flow through the cyclone filter, the cyclone filter contains a suitable automatic closing device. This closing device comprises a closing body 36 which by way of a shaft 36a is axially movably guided in a guide 37 fixed on the funnel wall 24c of the cyclone pot 24. The closing body 36 is pressed downward by a coil spring 38 acting as a pressure spring which is supported on top against a spring seat 37a of the guide 37. The radial exterior surface 36b of the plate-shaped valve body 36 is designed to have a truncated cone shape with a slope which matches the cyclone pot funnel wall 24c and, cooperating with the funnel wall 24c, represents the closing surface of the closing device which therefore forms a pressure-spring-loaded cone closure. On its radial conical exterior side, the closing surface 36b carries a ring seal 35.

For operating the closing device, an operating pin 39 is provided on the particle collecting pot 33. When the particle collecting pot 33 is connected, as illustrated in FIG. 11, this operating pin 39 presses the valve body 36 upward against the pressure spring force and thereby lifts it off the cyclone pot funnel wall 24c. The downward-falling particles, which were separated in the cyclone filter form the gas flow guided through, arrive on the sloped cyclone pot funnel wall 24c and move, as indicated by the arrow P, along the funnel wall 24c through the gap formed between the funnel wall and the valve body closing surface or radial exterior surface 36b downward into the particle collecting pot 33. When the particle collecting pot 33 is removed for an emptying, the operating pin 39 will withdraw from the cyclone pot 24 so that, because of its gravity and the force of the pressure spring 38, the valve body 36 moves downward until its closing surface 36b sealingly comes to rest against the cyclone pot funnel wall 24c. The pressure spring 38 ensures this automatic closing movement even when the valve body gravity, because of a different spatial orientation of the cyclone filter, does not act in this direction. The cone closure will still reach the closing position before the particle collecting pot 33 has been completely removed from the cyclone pot 24 and thus prevents in a reliable manner that, when the particle collecting pot 33 is removed, particles can emerge from the cyclone pot 24 in the downward direction. On the other hand, the operation of the cyclone filter does not have to be interrupted for the exchange of the particle collecting pot 33 because, until an empty particle collecting pot 23 is connected, the particles which separate from the gas flow into the cyclone filter can collect without any problem on the cyclone pot funnel wall 24c above the closing body 36.

As soon as an empty particle collecting pot 33 is then connected again on the bottom to the cyclone pot 24, when the particle collecting pot 33 is placed and screwed onto the lower part of the cyclone pot funnel wall 24, the operating pin 39 of the particle collecting pot 33 automatically lifts the valve body 36 upward while forming the particle passage gap 40 off the cyclone pot funnel wall 24c against the force of the pressure spring 38 and holds it in this open position. When the cyclone filter is used in a chemical process system, such as a reforming reactor system, separated particles can be emptied out from the cyclone filter in this manner without interrupting the operation of the cyclone filter and thus of the whole process system.

On the whole, by using one particle filter or combining several of the illustrated particle filters, reforming reactor systems according to the invention can be implemented which, in particular, can also be used for the water vapor reforming of methanol in fuel-cell-operated motor vehicles and, in the process, optimally meet the requirements to be made with respect to such mobile systems, such as a high freedom of particles of the reformate gas flow, a low pressure loss of the gas flow, temperature stability up to at least approximately 250° C., low heat losses, a filter change without the entering of oxygen into the reactor and ease of assembling.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gas reforming reactor system, comprising:
   a reactor unit with a catalyst-filled reaction space;
   a sieve which carries a catalyst fill charged into the reaction space, and is designed for sieving-out fragments and dust particles of the catalyst fill;
   a metallic nonwoven for collecting sieved-out fragments and dust particles, which metallic nonwoven is arranged in the reaction space at a distance below the sieve, forming a space situated in-between which is free of metallic nonwovens;
   a reformate gas pipe connected to said space in-between; and
   a particle filter arranged in the reformate gas pipe downstream of the reactor unit.

2. Reforming reactor system according to claim 1, wherein the particle filter comprises a spun steel wool netting.

3. Reforming reactor system according to claim 1, wherein the particle filter includes plural filter units which are serially connected behind one another.

4. Reforming reactor system according to claim 3, wherein said filter units include openings which are offset from openings in a next adjacent filter unit.

5. Reforming reactor system according to claim 3, wherein said filter units include openings with upstream ones of said filter units having larger openings than downstream ones of the filter units.

6. Reforming reactor system according to claim 1, wherein the particle filter in the reformate gas pipe includes a thermally insulating jacket.

7. Reforming reactor system according to claim 2, wherein the particle filter in the reformate gas pipe includes a thermally insulating jacket.

8. Reforming reactor system according to claim 3, wherein the particle filter in the reformate gas pipe includes a thermally insulating jacket.

9. Reforming reactor system according to claim 5, wherein the particle filter in the reformate gas pipe includes a thermally insulating jacket.

10. Reforming reactor system according to claim 1, wherein the particle filter is removably disposed in the reformate gas pipe, whereby said particle filter can be exchanged without interrupting operation of the system.

11. Reforming reactor system according to claim 2, wherein the particle filter is removably disposed in the reformate gas pipe, whereby said particle filter can be exchanged without interrupting operation of the system.

12. Reforming reactor system according to claim 3, wherein the particle filter is removably disposed in the reformate gas pipe, whereby said particle filter can be exchanged without interrupting operation of the system.

13. Reforming reactor system according to claim 5, wherein the particle filter is removably disposed in the reformate gas pipe, whereby said particle filter can be exchanged without interrupting operation of the system.

14. Reforming reactor system according to claim 1, wherein the particle filter includes a filter housing into which the reformate gas pipe leads at a filter housing gas inlet, and from which the reformate gas pipe leads out at a filter housing gas outlet, said filter housing being adapted to receive insertion of a respective filter body in an exchangeable manner transversely to a longitudinal axis of the gas pipe, whereby during a filter change, a previously inserted filter body is pushed out of the filter housing by a filter body which is newly slid into the filter housing, sealing devices being provided against a leakage of gas during the filter change.

15. Reforming reactor system according to claim 1, wherein said particle filter comprises:
    a cyclone pot which has a gas inlet opening and a gas outlet opening; and
    a particle collecting pot removably connected to a bottom of the cyclone pot and including a closing device which automatically opens the cyclone pot in a downward direction when the particle collecting pot is connected and automatically closes the cyclone pot when the particle collecting pot is removed.

16. Reforming reactor system according to claim 15, wherein the closing device contains:
    a closing body which is movably arranged in the cyclone pot and is pressed by a pressure spring into a closing position resting against a cyclone pot wall; and
    an operating element which, during the connecting of the particle collecting pot, presses the closing body against the pressure spring force into an opening position spaced away from the cyclone pot wall.

17. A gas reforming reactor system, comprising:

a reactor unit with a catalyst-filled reaction space;

a sieve which carries a catalyst fill charged into the reaction space, and is designed for the sieving-out of fragments and dust particles of the catalyst fill;

a metallic nonwoven for collecting the sieved-out fragments and dust particles, which metallic nonwoven is arranged in the reaction space at a distance below the sieve, forming a space situated in-between which is free of metallic nonwovens; and a reformate gas pipe connected to said space in-between; and a particle filter arranged in the reformate gas pipe.

* * * * *